United States Patent
Danton et al.

(10) Patent No.: US 7,979,847 B2
(45) Date of Patent: Jul. 12, 2011

(54) VISUAL DEBUGGER FOR DECLARATIVE/DATA-FLOW APPLICATIONS

(75) Inventors: Stephen M. Danton, Seattle, WA (US); William E. Aitken, Mercer Island, WA (US); Simon D. Kent, Redmond, WA (US); Siddharth Jayadevan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 956 days.

(21) Appl. No.: 11/864,222

(22) Filed: Sep. 28, 2007

(65) Prior Publication Data
US 2009/0089756 A1    Apr. 2, 2009

(51) Int. Cl.
*G06F 9/44* (2006.01)
(52) U.S. Cl. ......... 717/125; 717/117; 717/124; 717/129
(58) Field of Classification Search .................. 707/124
See application file for complete search history.

(56) References Cited

U.S. PATENT DOCUMENTS

| | | | |
|---|---|---|---|
| 1,331,018 A * | 2/1920 | Luthy ............................ | 429/143 |
| 5,974,474 A * | 10/1999 | Furner et al. ..................... | 710/8 |
| 6,016,474 A | 1/2000 | Kim et al. | |
| 6,412,106 B1 | 6/2002 | Leask et al. | |
| 6,424,991 B1 * | 7/2002 | Gish ............................ | 709/203 |
| 6,493,868 B1 | 12/2002 | DaSilva et al. | |
| 6,550,061 B1 * | 4/2003 | Bearden et al. ................ | 717/174 |
| 6,647,092 B2 * | 11/2003 | Eberhard et al. ................ | 378/65 |
| 6,807,631 B2 * | 10/2004 | Fuller et al. .................... | 713/100 |
| 6,854,073 B2 | 2/2005 | Bates et al. | |
| 7,162,664 B2 | 1/2007 | Haselden et al. | |
| 2003/0097551 A1 * | 5/2003 | Fuller et al. ....................... | 713/1 |
| 2004/0172623 A1 | 9/2004 | Eckels et al. | |
| 2006/0064677 A1 | 3/2006 | Bickson et al. | |
| 2006/0174225 A1 | 8/2006 | Bennett et al. | |
| 2006/0285535 A1 * | 12/2006 | Metcalf et al. ................. | 370/352 |
| 2006/0288332 A1 | 12/2006 | Sagar et al. | |
| 2007/0226395 A1 * | 9/2007 | Mejias Butron ................. | 711/4 |
| 2008/0244563 A1 * | 10/2008 | Sonkin et al. ................. | 717/175 |
| 2009/0221269 A1 * | 9/2009 | Bulmer et al. ............. | 455/414.1 |
| 2010/0125735 A1 * | 5/2010 | Zapata et al. ................. | 713/170 |

OTHER PUBLICATIONS

MSDN, Visual Studio Debugger Debugging in Visual Studio, 2007, 1 page http://msdn2.microsoft.com/en-us/library/sc65sadd(d=printer).aspx.

Kranzlmuller, Dieter, et al., "Why Debugging Parallel Programs Needs Visualization?" Proc. VMPDP 2000, Workshop on Visual Methods for Parallel and Distributed Programming 2000, Seattle, WA, USA (Sep. 2000).

Tolmach, Andrew, et al., "A Debugger for Standard ML", J. Functional Programming, Jan. 1993, 47 pages.

Tikir, Mustafa M., et al., "Recompilation for Debugging Support in a JIT-Compiler", PASTE '02, Nov. 2002, pp. 10-17.

* cited by examiner

*Primary Examiner* — Lewis A Bullock, Jr.
*Assistant Examiner* — Muluemebet Gurmu
(74) *Attorney, Agent, or Firm* — Workman Nydegger

(57) ABSTRACT

A framework is implemented. The framework is configured to execute an application within the framework, the application includes instantiated runtime objects. New instantiated runtime objects may be created and instantiated runtime objects destroyed while the application is executing. The framework is further configured to implement a debugger within the framework. At the debugger, instantiated runtime objects are correlated with lines of code of the application. Some embodiments allow users to debug executing applications. This can be accomplished by a user interacting with the executing application which then causes indications in the debugger or interacting with the debugger and which causes indications on instantiated runtime objects in the application.

16 Claims, 2 Drawing Sheets

VISUAL DEBUGGER FOR DECLARATIVE/DATA-FLOW APPLICATIONS

BACKGROUND

Background and Relevant Art

Computers and computing systems have affected nearly every aspect of modern living. Computers are generally involved in work, recreation, healthcare, transportation, entertainment, household management, etc.

With the advanced functionality of many computer systems, a significant amount of computer programming has become highly complex involving millions of lines of code and the efforts of multiple computer programmers for a single application or system. In addition to the sheer manpower required to generate such vast amounts of code, there may also be a need for specialized computer programmers to implement specialized portions of application code. As a result, it is difficult to maintain code where a single manager is aware of all of the functionality of an application or system and the code used to implement the different functions on a function by function basis.

Understandably, with the diverse nature of features for a single application, and inasmuch as knowledge about the programming code implementing the features is diversified among a number of programmers and experts, central debugging of an application can be difficult. For example, a developer tasked with debugging an application may be able to recognize a bug in a runtime artifact that occurs as a result of executing some portion of code, but the developer will likely not readily be able to identify the code that is responsible for the bug. Typically this will require the developer to manually examine large amounts of code and/or attempt to place breaks and/or tracers in the code prior to running the code to attempt to isolate the bug.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method. The method may be practiced in a computing environment. The method includes acts for debugging declarative code. The method includes accessing instantiated declarative code. The instantiated declarative code includes lines of code. The lines of code define runtime artifacts. The method further includes automatically correlating lines of code to instantiated runtime artifacts. The instantiated runtime artifacts are represented in a hierarchical tree based on the correlation of lines of code to instantiated runtime artifacts. The hierarchical tree shows the hierarchical structure of the instantiated declarative code.

Another method may be practiced in a computing environment. The method may include acts for debugging executing declarative code. The method includes accessing instantiated declarative code. The instantiated declarative code includes lines of code. The lines of code define runtime artifacts. Lines of code are automatically correlated to corresponding instantiated runtime artifacts. User input is received selecting one of lines of code or one or more instantiated runtime objects. One or more instantiated runtime objects or lines of code corresponding to the selected lines of code or selected one or more runtime objects are indicated.

Another embodiment includes a computer readable medium including computer executable instructions that when executed by a processor are configured to implement a framework. The framework is configured to execute an application within the framework, the application includes instantiated runtime objects, where new instantiated runtime objects may be created and instantiated runtime objects destroyed while the application is executing. The framework is further configured to implement a debugger within the framework. At the debugger, instantiated runtime objects are correlated with lines of code of the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein may comprise a special purpose or general-purpose computer including various computer hardware, as discussed in greater detail below.

Some embodiments are directed to facilitating debugging of declarative code. This may be accomplished by running a declarative language application in a framework, which includes functionality for automatically correlating lines of code to instantiated runtime objects. A debugger application included in the framework may include visual representations of code, hierarchical representations of runtime objects, variable states and values, etc. The framework allows for a number of unique functions to be implemented, including the ability to receive user input selecting either lines of code or runtime objects and in response, highlighting corresponding runtime objects or lines of code. This allows a user to perform live application debugging on an executing application without the need to stop the application from running. Additionally, a user can place a watch or breakpoint in code by interacting with an instantiated runtime object while the application is executing as opposed to direct interaction with the code itself prior to executing the application. In one embodiment, a user can add a breakpoint to an instantiated runtime object by directly interacting with the runtime object as opposed to needing to instrument the code to insert the breakpoint. Other features and functionality are included as will be described in more detail below.

Figure 1:
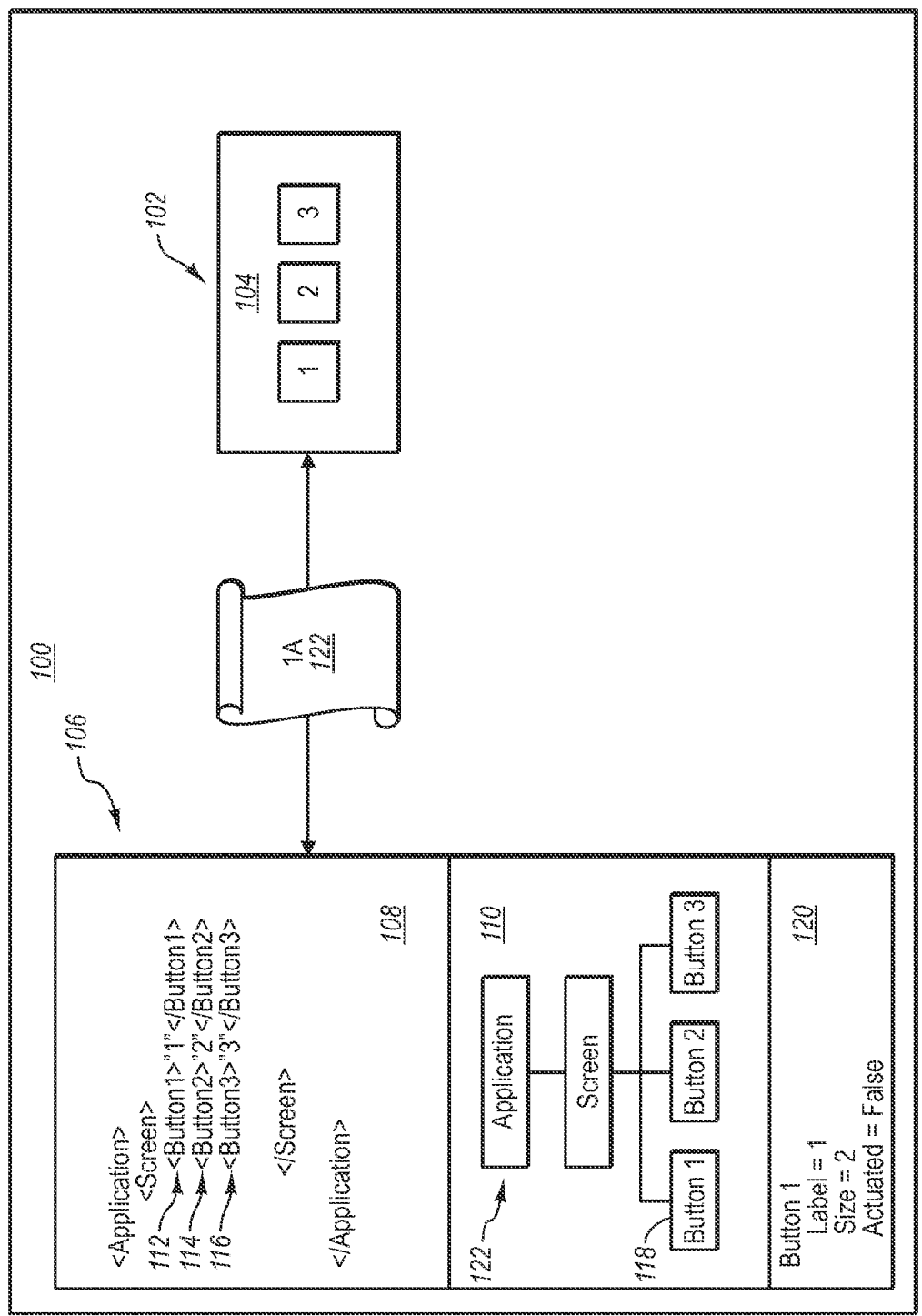
FIG. 1 illustrates a debugging framework.

Referring now to FIG. 1, an example embodiment is illustrated. FIG. 1 illustrates a framework 100. The framework 100 allows applications, such as application 102 to be run from within the framework. The application 102 comprises instantiated runtime objects created when application code is run. Instantiated runtime objects may be visual or non-visual as appropriate. An instantiated runtime object is a portion of a running application. In the example shown, the application 102 includes a visual instantiated runtime object in the form of a screen 104 and three visual instantiated runtime objects in the form of buttons labeled "1," "2," and "3."

FIG. 1 also illustrates a debugger application 106. The debugger application 106 includes three windows. In this example, the three windows included are a code window 108, a hierarchy window 110, and a value window 120. The code window 108 includes the lines of code used to instantiate the application 102. Different lines of code may be used to instantiate different corresponding runtime objects. For example, the code window includes lines of code 112, 114, and 116 used to instantiate the buttons 1, 2, and 3 of the application 102 respectively.

The framework 100 includes functionality for automatically, without programmer intervention, correlating instantiated runtime objects to the lines of code. For example, the framework 100 can correlate button 1 of application 102 to the code illustrated at 112. In one embodiment, this may be accomplished by executing code where the code causes a runtime object to be instantiated, and then correlating the instantiated runtime object with the code executed to instantiate the runtime object.

Notably, embodiments may be implemented where correlation of runtime objects and instantiated code is continuously performed as an application executes. As such, the debugger 106 will reflect the current state of the application 102. For example, if the application 102 changes state during execution, different code may be instantiated, and different runtime objects may be instantiated. Thus, the framework 100 can, without user intervention at the debugger or otherwise, update a correlation between the presently instantiated runtime code with the present instantiated runtime objects. This updating of the correlation will also affect views in the debugger 106 including code window 108, hierarchy window 110, and value window 120. The updating will also affect queries and watches, as described in more detail below, that a user at the debugger can perform.

When the application 102 is run within the framework 100, various features and functionality can be implemented. For example, in one embodiment a user may be able to interact with instantiated runtime objects instantiated in the application 102 in a fashion which causes the debugger application 106 to indicate corresponding lines of code, portions of hierarchical structure, variable or attribute values etc. For example, a user may be able to use a mouse gesture and/or keyboard commands to select or watch the instantiated runtime object button 1. At the debugger 106, this may cause an indication of code and/or hierarchical representation. For example, the code illustrated at 112 and/or the hierarchical representation at 118 may be indicated if a user selects the button 1 of the application 102. Indicating may include highlighting, font or line drawing color changes, presence or absence of a graphical icon, or any other suitable form of indication.

Embodiments may also include functionality such that when an instantiated runtime object is selected, the debugger 106 allows a user to view an instantiated runtime object's data. For example, in the example shown in FIG. 1, selecting button 1 allows for viewing the button's data (dimensions, styling information, etc) in the value window 120 as well as any control flow code that allowed the button to be created in the source code window 108, user interface controls that the button is associated with, for instance the button's parent container (e.g. the screen object illustrated at 110) or children controls contained by the button, and any event handlers associated with the button such as, for example, OnClick, MouseOver, etc. While remaining at the visual level, users can then add breakpoints to event handlers, add watches to specific controls or explore the logical expressions related to control flow code.

As noted previously, some embodiments allow a user to perform live application debugging without needing to stop the application. For example, a user can add watches or select instantiated runtime objects as the application is executing. This allows a user to add watches and breakpoints without needing to instrument the application code by direct user interaction with the application code. Additionally, a user may add a breakpoint on running code such that an action breakpoint can be used to stop an application from running such that state of the application can be inspected, or custom value inputs and code stepping can be performed.

In particular, breakpoints can be placed on actions associated with objects. Specifically objects created in the application 102 are responsive to events, such as for example, to mouse clicks or rollovers, keystrokes, etc. The declarative description of applications allows actions to be associated with events on an object. These actions are run when the event occurs. For example, if a selection in the application 102 is achieved through mouse clicks, an action may be associated to maintain the selection with a particular mouse click event for objects, such as selection of a particular object. The debugger 106 would then allow the application 102 to be stopped when this action was run.

In one embodiment, a user can create as many watches and breakpoints as they like, where each of them is managed by the visual debugger's user interface and can be revisited or explored at any time.

Some embodiments allow for defining "what-if" queries against runtime application data. This allows user to apply a watch to all instances of a particular type or explicitly to one instance within an application. For example, consider a user that is debugging a calendaring application. It might be interesting to view all of the appointment controls currently shown for the selected time range. Using a standard query builder interface, the user is able to construct the appropriate query and is returned a watch collection. With this collection the user can browse through all of the appointment controls, making sure that all controls are displaying correctly, no controls are hidden, etc.

In particular, in querying, the debugger 106 has an internal data structure that represents the state of the target application 102. Queries can be written against this data structure, yielding entries in this structure. These entries can then be mapped back to objects in the running application 102. The queries may include a "liveness" factor that reflects the live state of the application. For example, consider an application where selection by a user of one option will display two icons, where selection of a second option will display only a single icon. Suppose further that the debugger 106 has a query asking for all icons. When a reselection is made from the options displaying one icon to the option displaying two icons, the number of icon watches returned by this query will go from one to two. Further details illustrating how queries and results can be communicated are illustrated in U.S. patent application Ser. No. 11/360,457, titled XML Application Framework, Filed on Feb. 23, 2006 and incorporated herein by reference in its entirety.

Additionally, adding a watch can provide for additional functionality in addition to looking at code or local data. An added watch may also provide a starting point for more ambitious exploration, such as by using a multi-view approach to all of the data associated with a particular watch or breakpoint. For example, a user can author queries against the current data context to test out potential data input scenarios. Alternatively, a user can pass new data into the selected control to see how it will behave under different conditions. For example, while the value window 120 illustrates particular values for attributes are variables of instantiated runtime objects, a user may be able to interact with the value window to update values to determine how an application will respond to the changed values. For example, the "actuated" attribute is "false" in the current example. However, a user can run a query where the "actuated" attribute is changed to "true." The effects of such an action can then be observed at the application 102. Additionally, completely unexpected values can be queried if such a test is desired. For example, a user may use a query to change the "actuated" value from "false" to "4000." This allows for additional debugging and code coverage functionality.

In one embodiment, to implement this functionality, the writeable state of the application 102 may be modified. This may be accomplished, for example, by using an interface between the debugger 106 and a data store or other input entity which provides underlying data to the application 102. For example, an application 102 may operate on data in a database. If the debugger 106 has authorization to operate on data in the database, then the debugger 106 can alter underlying data stored in the database and operated on by the application 102.

While the preceding examples have focused generally on more general application control flow and visual control views, users can also look at just the visuals or just the data concepts that are associated with a particular control. As a result, users can easily select a visual element and jump directly into its associated code definition. For example, as discussed previously, a user may select an instantiated runtime such as button 1 in the application 102, which causes the code 112 in the code window 108 to be indicated.

Embodiments may include other functionality as well. For example, in one embodiment, performance hot spots may be identified. This may be accomplished by using the relationship between instantiated runtime objects and hierarchical representations. For example, metric functionality may be implemented in the debugger 106 to track the number of times different branches in the hierarchical representation 122 are traversed.

In one embodiment, to facilitate the correlation between instantiated runtime objects and lines of application code, a communication mechanism that communicates between the debugger 106 and the application 102 may be implemented. Notably, runtime objects in an application 102 may be created or destroyed during the execution of an application. For example, consider a calendaring application that allows for different views, such as monthly views, weekly views, daily views, etc. Certain runtime objects will be instantiated for the monthly view that are destroyed and replaced by other runtime objects when the view is changed to a weekly view. Thus, the previously mentioned communication mechanism can be used to inform the debugger 106 which runtime objects are currently instantiated.

FIG. 1 illustrates a message 122 representing a communication path between the application 102 and the debugger 106. To ensure that the debugger has an accurate record of currently instantiated runtime objects, the message 122 can be sent to the debugger, where the message may include an indication when an object is instantiated or destroyed at the application. The debugger 106 can then update views and/or correlation information as appropriate.

In the example illustrated, the message 122 includes an identifier 1A. The identifier includes a portion that correlates to an instantiated runtime object and a portion that correlates to portions of code. In this example, 1 of 1A represents the instantiated runtime object button 1 while A represents the code at 112. The message 122 may further include an indicator that runtime object is being instantiated or destroyed.

Notably, embodiments further allow for a similar message 122 to be sent back to the application 102. This allows for a number of functions to be accomplished. For example, in one embodiment, the message 122 can be sent from the debugger 106 to the application 102 in the form of a query, which can be used to obtain state information. For example, using this functionality, the debugger may be able to query the application 102 to obtain the information displayed in the value window 120.

Further illustrating the functionality of the communication path, a user at the debugger 106 can use the communication path represented by the message 122 to send messages to the application 102. This allows the user to establish watches and breakpoints, submit query parameters, obtain attribute values, etc.

As noted above, the debugger 106 reflects the current state of the application. Thus, if the state of the application 102 changes, due to user input at the application 102, due to the ordinary operation of the application 102, or for other reasons, the debugger 106 can reflect these changes in the current state of the application 102. Thus, the debugger view will display items relevant to the current state of the application and allow a user to implement watches, queries and other functionality against this current state.

Figure 2:
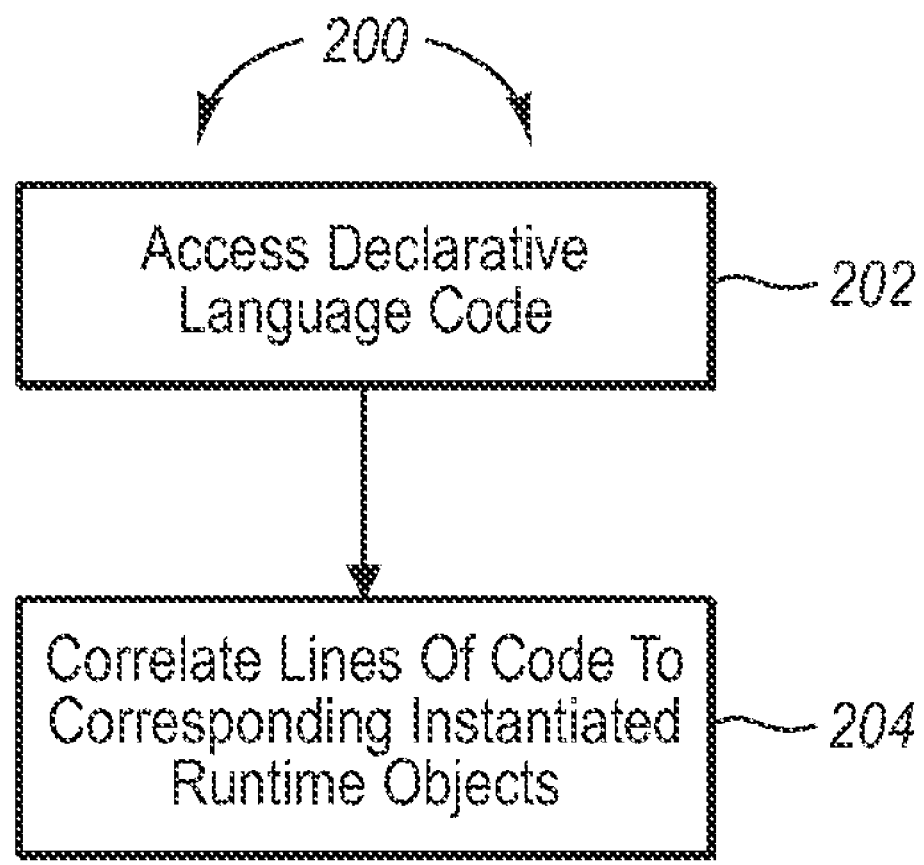
FIG. 2 illustrates a method of correlating lines of code to instantiated runtime objects.

Referring now to FIG. 2, a method 200 is illustrated. The method may be practiced, for example, in a computing environment. The method includes acts for debugging declarative code. The method includes accessing instantiated declarative code (act 202). The instantiated declarative code includes lines of code, where the lines of code define runtime artifacts. For example, as illustrated in FIG. 1, the line of code at 112, when instantiated, results in the instantiation of the button 1 illustrated at the application 102.

The method 200 further includes automatically correlating lines of code to instantiated runtime artifacts (act 204). In one embodiment, correlating lines of code to runtime artifacts executing lines of code, where executing different lines of code results in different runtime artifacts being instantiated. Each runtime artifact is then correlated to the respective lines of code that were executed to instantiate each runtime artifact. Correlating lines of code to runtime artifacts may include correlating a code identifier to an object identifier and sending the correlation of the code identifier to the object identifier to a debugger module configured to display the hierarchical tree. For example, FIG. 1 illustrates an example where the message 122 includes the identifier 1A, which includes both a object identifier and a code identifier. The message 122 can be sent to the debugger 106.

The method 200 may further include representing the instantiated runtime artifacts in a hierarchical tree based on the correlation of lines of code to instantiated runtime artifacts. The hierarchical tree shows the hierarchical structure of the instantiated declarative code. An example of this is illustrated in the hierarchy window 110 illustrated in FIG. 1.

The method 200 may further include receiving user input at a debugger module selecting code and in response to the user input, highlighting a runtime artifact occurring as a result of executing the selected code. As discussed previously, and as can be understood by inspection of FIG. 1, a user may select code, such as for example the code illustrated at 112. Selecting the code may include, for example, using mouse gestures or keyboard commands interacting with a graphical user interface to indicate what code is to be selected. In response, a message 122 may be sent to the application 102 within the framework 100 which causes a runtime artifact, such as button 1 to be indicated. Indicating may include changes in appearance, including changes in color, size, shape, etc. Indicating may also include external graphical indicators such as pointers, highlighting, borders, etc.

Similarly, the method 200 may further include receiving user input selecting an instantiated runtime artifact occurring as a result of executing code and in response to the user input, highlighting the code that when executed causes the instantiation of the runtime artifact. For example, a user may perform a selection action, such as a mouse gesture or keyboard command on the button 1 of the application 102. Within the framework, a message 122 may be sent to the debugger 106 indicating the selection. The debugger 106 can then indicate the code 112 using any appropriate indicating technique.

In yet another similar embodiment, the method 200 may include receiving user input selecting an instantiated runtime artifact occurring as a result of executing code and in response to the user input, highlighting a representation of the instantiated runtime artifact in a debugger module. For example, referring to FIG. 1, a user may select button 1 of the application 102, in response, an indication may be made to the hierarchical representation 118.

The method 200 may further include receiving user input associating a watch or break with a visual runtime artifact. The user input may include a gesture performed on the visual runtime artifact.

The method 200 may further include displaying attribute values of instantiated runtime objects. For example, the values window 120 may include values for the button 1, such as for example when the button 1 is selected in the application 102.

The method 200 may further comprise receiving user input at a debugger specifying a query watch, where the query watch specifies that a watch should be applied to all instances of a particular type. Data for an instantiated object of the particular type is displayed whenever the instantiated object is of the particular type.

Embodiments may also include computer-readable media for carrying or having computer-executable instructions or data structures stored thereon. Such computer-readable media can be any available media that can be accessed by a general purpose or special purpose computer. Computer readable media is divided into two categories: computer storage media and communication media. Computer storage media comprise RAM, ROM, EEPROM, CD-ROM or other optical disk storage, magnetic disk storage or other magnetic storage devices. Computer storage media, however, do not encompass signals. In contrast, communication media encompass signals. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented by one or more processors of one or more computers, for debugging a declarative language application comprising:
    executing the declarative language application within a framework, wherein during execution of the declarative language application, one or more runtime objects are instantiated wherein at least one of the one or more runtime objects is a graphical user interface button which is displayed to a user, the graphical user interface button being a component of the declarative language application such that the button is generated during execution of the declarative language application whether the declarative language application is executed within or without the framework;
    while the declarative language application is being executed, receiving input from the user that selects one of the at least one graphical user interface buttons, the selection specifying the user's desire to view debugging information related to the selected graphical user interface button; and
    in response to the user input, displaying the debugging information related to the selected graphical user interface button, wherein the debugging information includes:
        lines of code within the source code of the declarative language application where the selected graphical user interface button is defined;
        a hierarchy of other graphical user interface elements that are related to the selected graphical user interface button; and
        values of the selected graphical user interface button.

2. The method of claim 1 wherein the hierarchy of other graphical user interface elements includes any parent elements and child elements of the selected graphical user interface button.

3. The method of claim 1 wherein the values of the selected graphical user interface button include dimensions of the button, or styling information of the button.

4. The method of claim 1 wherein displaying the lines of code further includes highlighting specific lines of code within the source code where the selected graphical user interface button is defined.

5. The method of claim 1 wherein displaying the lines of code further includes displaying event handlers associated with the selected graphical user interface button.

6. The method of claim 1, further comprising:
receiving, while the declarative language application is being executed, second user input within the displayed lines of code that specifies a particular location within the source code within the declarative language application; and
creating a breakpoint at the particular location.

7. The method of claim 1, further comprising:
receiving a query from the user that requests information regarding all graphical user interface elements of a specified type;
in response to the input, determining which graphical user interface elements of the specified type are currently active in the executing declarative language application; and
displaying each of the currently active graphical user interface elements to the user.

8. The method of claim 1, further comprising:
receiving user input comprising new values to replace the existing values of the selected graphical user interface button;
replacing the existing values with the new values; and
continuing to execute the declarative language application with the new values.

9. One or more computer storage media storing computer executable instructions which when executed by one or more processors of one or more computers implement a method for debugging a declarative language application comprising:
executing the declarative language application within a framework, wherein during execution of the declarative language application, one or more runtime objects are instantiated wherein at least one of the one or more runtime objects is a graphical user interface button which is displayed to a user, the graphical user interface button being a component of the declarative language application such that the button is generated during execution of the declarative language application whether the declarative language application is executed within or without the framework;
while the declarative language application is being executed, receiving input from the user that selects one of the at least one graphical user interface buttons, the selection specifying the user's desire to view debugging information related to the selected graphical user interface button; and
in response to the user input, displaying the debugging information related to the selected graphical user interface button, wherein the debugging information includes:
lines of code within the source code of the declarative language application where the selected graphical user interface button is defined;
a hierarchy of other graphical user interface elements that are related to the selected graphical user interface button; and
values of the selected graphical user interface button.

10. The one or more computer storage media of claim 9 wherein the hierarchy of other graphical user interface elements includes any parent elements and child elements of the selected graphical user interface button.

11. The one or more computer storage media of claim 9 wherein the values of the selected graphical user interface button include dimensions of the button, or styling information of the button.

12. The one or more computer storage media of claim 9 wherein displaying the lines of code further includes highlighting specific lines of code within the source code where the selected graphical user interface button is defined.

13. The one or more computer storage media of claim 9 wherein displaying the lines of code further includes displaying event handlers associated with the selected graphical user interface button.

14. The one or more computer storage media of claim 9, further comprising:
receiving, while the declarative language application is being executed, second user input within the displayed lines of code that specifies a particular location within the source code within the declarative language application; and
creating a breakpoint at the particular location.

15. The one or more computer storage media of claim 9, further comprising:
receiving a query from the user that requests information regarding all graphical user interface elements of a specified type;
in response to the input, determining which graphical user interface elements of the specified type are currently active in the executing declarative language application; and
displaying each of the currently active graphical user interface elements to the user.

16. The one or more computer storage media of claim 9, further comprising:
receiving user input comprising new values to replace the existing values of the selected graphical user interface button;
replacing the existing values with the new values; and
continuing to execute the declarative language application with the new values.

* * * * *